United States Patent [19]

Funk

[11] 4,265,088
[45] * May 5, 1981

[54] SYSTEM FOR TREATING AND RECOVERING ENERGY FROM EXHAUST GASES

[76] Inventor: Harald F. Funk, 68 Elm St., Murray Hill, N.J. 07974

[ * ] Notice: The portion of the term of this patent subsequent to Nov. 21, 1995, has been disclaimed.

[21] Appl. No.: 962,103

[22] Filed: Nov. 17, 1978

Related U.S. Application Data

[63] Continuation-in-part of Ser. No. 674,219, Apr. 6, 1976, Pat. No. 4,126,000, which is a continuation-in-part of Ser. No. 565,045, Apr. 4, 1975, Pat. No. 3,970,524, which is a continuation-in-part of Ser. No. 486,562, Jul. 8, 1974, abandoned, which is a continuation-in-part of Ser. No. 252,610, May 12, 1972, abandoned.

[51] Int. Cl.³ .............................................. F01K 21/00
[52] U.S. Cl. ......................................... 60/648; 55/23; 55/68; 55/73; 60/643; 60/566; 60/645; 60/670
[58] Field of Search ................. 55/23, 68, 73; 60/643, 60/645, 648, 685, 670, 690, 649; 62/12, 14, 23

[56] References Cited

U.S. PATENT DOCUMENTS

| | | | |
|---|---|---|---|
| 2,268,357 | 12/1941 | Turner | 60/649 |
| 2,753,701 | 7/1956 | Palmer et al. | 62/14 |
| 3,164,957 | 1/1965 | Fricke | 60/649 |
| 3,618,331 | 11/1971 | Smith et al. | 62/23 |
| 3,704,570 | 12/1972 | Gardenier | 55/84 |
| 3,766,971 | 10/1973 | Baum | 55/222 |
| 3,839,849 | 10/1974 | Maniya | 165/1 |
| 3,905,197 | 9/1975 | Miller | 60/649 |
| 3,905,784 | 9/1975 | Kelleher et al. | 55/73 X |
| 3,926,582 | 12/1975 | Powell, Jr. et al. | 201/2.5 |
| 3,970,524 | 7/1976 | Funk | 201/236 |

*Primary Examiner*—S. Clement Swisher
*Attorney, Agent, or Firm*—Sixbey, Friedman & Leedom

[57] ABSTRACT

A method and apparatus for treating hot exhaust gas to purify the gas and to recover the heat values therein includes removing particulate matter from the gas, purifying the gas by subliming or "freezing out" harmful, less volatile components and discharging the more volatile components as purified gas. The sublimed or "frozen out" components are collected and neutralized or utilized. The heat values may be recovered prior or subsequent to purifying, such as by spraying a power fluid into the gas to cool and increase the volume of the gas and then expanding the gas in an expansion turbine to further cool the gas and to produce shaft work. Alternatively, the heat values may be recovered from purified, hot gas by transferring the heat energy of the gas to a power fluid which operates in a Rankine cycle external combustion engine to do shaft work.

32 Claims, 4 Drawing Figures

SYSTEM FOR TREATING AND RECOVERING ENERGY FROM EXHAUST GASES

CROSS REFERENCE TO RELATED APPLICATIONS

The present application is a continuation-in-part of application Ser. No. 674,219 filed Apr. 6, 1976, now U.S. Pat. No. 4,126,000, which application was a continuation-in-part of application Ser. No. 565,045 filed Apr. 4, 1975, (now U.S. Pat. No. 3,970,524) which application was a continuation-in-part of application Ser. No. 486,562 filed July 8, 1974 (now abandoned), which application, in turn, was a continuation-in-part of application Ser. No. 252,610 filed May 12, 1972 (now abandoned), the disclosures of which are incorporated by reference.

BACKGROUND OF THE INVENTION

1. Field of the Invention

The present invention relates generally to the treatment of exhaust gases for discharge to the atmosphere, and more particularly to methods and apparatus for treating and recovering energy from hot exhaust gases.

Exhaust gases suitable for treatment by the system of the present invention include combustion exhaust gases produced in fuel burning furnaces, roasters and the like, exhaust gases such as those produced in cement kilns and the like, and exhaust gases containing such components as nitrogen, carbon dioxide, carbon monoxide, hydrogen chloride, hydrogen sulfide, hydrocarbon gases, and the like. Preferably, the exhaust gases are essentially inert but include noxious components and traces of combustible gases.

2. Prior Art

Hot exhaust gases generated during the combustion of fuel have commonly been disposed of by exhausting them to atmosphere through tall chimneys or stacks. Disadvantages of this method of disposal include resulting air pollution and its harmful effects on the environment, a waste of recoverable heat energy, and the high cost of constructing and maintaining tall stacks. Loss of recoverable heat energy is unavoidable because gases discharged into a stack must be substantially hotter than ambient air to produce an up-draft in the stack and to avoid condensation in the chimney. Moreover, the latent heat of steam in flue gases is not generally recovered in order to avoid condensation and the attendant corrosion, as a result of which additional, available heat energy is being wasted.

Where the latent heat of steam is not recovered, the system designer must work with "low heating values" of the gases rather than "high heating values". Low and high heating values for gases are given in such handbooks as the John N. Perry *Engineering Manual*, published in 1959 by McGraw Hill, where the following typical heating values are given:

| Gas | High Heating Value | Low Heating Value |
| --- | --- | --- |
| Hydrogen | 60,958 Btu/lb | 51,571 Btu/lb |
| Methane | 23,861 Btu/lb | 21,502 Btu/lb |
| Methyl alcohol (vapor) | 10,270 Btu/lb | 9,080 Btu/lb |

As will be apparent from these heating values, about 18 percent more Btu/lb can be recovered from hydrogen if its high heating value can be utilized, about 11 percent more from methane, and about 13 percent more from methyl alcohol vapor. Prior systems have not been able to utilize the high heating value of such gases.

As the public concern about air pollution has increased, stack heights have been increased to affect better dispersion of pollutants. However, increasing stack height adds to the cost of constructing and maintaining stacks, yet provides no solution to the underlying problem, i.e., avoiding emission in the first instance of harmful substances such as sulfur oxides, chlorine gases, phosphor oxides, etc.

A significant factor in air pollution is the increasing level of gaseous airborne pollutants which combine with moisture in the air to produce acids, e.g. carbon dioxide, sulfur dioxide, chlorine and fluorine. The carbon dioxide content in some industrial districts is as high as ten times normal. Acid forming pollutants have been found in some instances to increase the acidity of rainwater from its normal pH of about 6.9 to values of 4.0. Rainwater having a pH of 5.5 or less will destroy aquatic life and can do substantial harm to buildings, monuments, and other structures.

One proposal for removing acid forming components from exhaust gases is to scrub the entire flow of exhaust gases with water prior to discharging them through a stack. However, scrubbing the entire exhaust gas flow requires large quantities of water, which are not always available, and requires costly, large capacity scrubbing equipment. Indeed, scrubbing the entire flow of exhaust gases from some incinerators requires at least half the amount of water, by weight, of the solid wastes burned in the incinerator. Treating the large volume of scrub water needed in such a process is very costly and contributes to the impracticality of scrubbing as a total solution to the acid pollutant problem.

Another difficult pollutant to deal with effectively is sulfur in the flue gases. One proposal for the desulfurization of flue gas utilizes a series of heat exchangers to extract heat energy from the flue gas prior to a scrubbing operation. Heat extracted from the gas is returned to the gas following desulfurization and the gas is exhausted through a tall stack for diffusion into the atmosphere. This proposal has the disadvantages of wasting heat energy recovered from the gases, requiring large volumes of scrubbing water, requiring the use of a tall stack, and polluting the air with such noxious components as are not removed during scrubbing.

The problem of disposing of exhaust gases is now recognized as a major concern in industrial countries throughout the world. Dispersing emissions through the use of tall stacks is no longer regarded as an acceptable solution. Applicant's U.S. Pat. No. 3,970,524 discloses a system for gasification of solid waste materials and a method for treating the resulting gases to produce commercially useable gases in such a manner that dispersion through stacks is not necessary. A feature of one embodiment of this patent is pressurization of a combustion zone to such pressures as will permit blower and compression units to be eliminated from the gas treatment system. Another feature is the use of a multichamber gas treatment unit in which noxious gas components are sublimed or "frozen out" and thereby separated from the clean useable gas components. A problem not addressed by U.S. Pat. No. 3,970,524 is that of providing a system for treating combustion exhaust gases and productively reclaiming heat energy from the hot gases. This problem is, however, confronted in applicant's copending Application Ser. No. 674,219, filed Apr. 6, 1976. In this application, in addition to purifying the gases, the sensible and latent heat of the gases is transferred to a power fluid which is in indirect heat exchange relationship therewith, as in a conventional heat exchanger. However, the economics of indirect heat exchange is very poor and reduces the over-all desirability of such a system.

SUMMARY OF THE INVENTION

It is therefore an object of the present invention to overcome the foregoing economic and other drawbacks of the prior art, and to provide unique and improved methods and apparatus for purifying exhaust gases to remove harmful components and, optionally, for recovering heat energy therefrom.

Another object is to provide unique and improved methods and apparatus for treating exhaust gases to permit their discharge directly to atmosphere without the need for tall chimneys or stacks.

Still another object is to provide improved systems and methods for treating hot exhaust gases to recover heat energy therefrom and to sublime or "freeze out" certain harmful, less volatile components.

Other objects and advantages will become apparent from the following description and appended claims.

In accordance with the foregoing objects the present invention provides a method whereby exhaust gases are treated by separating out solid particles, by subliming or "freezing out" harmful, less volatile components of the gases for subsequent scrubbing or neutralization, and by exhausting the purified gases to atmosphere without using a stack. Combustible components of the neutralized gases are preferably reclaimed and used.

In one embodiment of the invention the exhaust gases, following solid particle removal and prior to purification by subliming or "freezing out", are subjected to treatment to recover the heat energy therein and to cool the gases. The heat energy is recovered by direct heat exchange mixing with a power fluid followed by expansion of the resulting gaseous flue gas-power fluid mixture through a turbine and condensation. Following condensation the power fluid may be recovered and recycled. In a modification of this embodiment the heat energy recovery is deferred until after purification, i.e., the purification step is practiced on hot exhaust gases immediately following solid particle removal.

In another embodiment of the invention the exhaust gases, after removal of solid particles therefrom, are purified in regenerators, i.e., less volatile components are sublimed, and the hot returned purified gas may either be used as such or subjected to processing to recover the heat energy therein.

In still another embodiment of the invention the exhaust gases are cooled prior to and heated following subliming using regenerators as heat exchangers. Again, the heated, purified gas may either be used as such or subjected to processing to recover the heat energy therein.

One noteworthy advantage of the various systems of the present invention is that they obviate the need for costly stacks. Another advantage of the present invention is that the systems consume only a small fraction of their power output as compared with conventional systems which utilize up to 10% of their power output. Still another advantage is that the systems of the present invention utilize sublimation or "freezing out" processes to separate out harmful gas components which can then be recovered and treated or neutralized, as by scrubbing, with far less water than would be required if the entire flow of exhaust gases were to be scrubbed as in prior proposals. The small volume of scrub water required for this operation can be treated at minimal cost with scrubbing equipment having a much smaller capacity than is required where the entire flow of exhaust gas is scrubbed. Substantial savings are achieved over prior processes inasmuch as large capacity scrubbing equipment is not required. The ability to utilize smaller capacity equipment is important also from the standpoint of minimizing the amount of expensive corrosion resistant material needed. As is well known, all scrubbing systems experience a severe corrosion problem requiring the provision of expensive corrosion resistant materials. In the present systems, where small scale rather than large scale equipment can be used due to the limited scrubbing volume, the amount of expensive corrosion resistant material needed is minimized.

Gas treatment methods and apparatus of the type described in U.S. Pat. No. 3,970,524 are used to effect a separation of harmful, less volatile exhaust gas components by the sublimation or "freezing out" process. The apparatus includes an arrangement of valve interconnected, packed, refrigerated towers through which exhaust gas passes to effect sublimation or "freezing out" of harmful components. Components which can be removed by this process include $CO_2$, HCl, $H_2S$, $SO_2$, $C_2H_2$, $NO_x$, HCN, $SO_3$, and the like. It is noteworthy that the vast majority of the gas treatment process is of a physical nature. Chemical treatment is not utilized until noxious gas components, which comprise only a small fraction of the total gas flow, are separated out. A particularly useful aspect of the present invention is that it permits noxious gases from many sources to be treated concurrently, thereby obviating the need for several separate gas treatment apparatus installations. Off gases from refinery equipment and the like can be collected and transferred through a sewer-like system of conduits and treated at a single installation with apparatus embodying the invention.

Another advantage of the system of the present invention lies in its capacity for recovery and utilization of heat energy. In certain embodiments, this heat energy is used to operate an external combustion or Rankine cycle engine. U.S. Pat. No. 3,702,534 describes one such engine and discloses suitable power fluids for use therewith and with the system of the present invention. In another embodiment of this invention the heat energy is recovered by direct mixing of either the hot flue gas or the hot purified gas with a power fluid. The mixture is used to operate an expansion turbine and generator to furnish power to the system or for other purposes.

Inasmuch as the system of the present invention provides a relatively simple and inexpensive method of purifying flue gases, it also permits the use of cheap fuels having a relatively high sulfur content. The savings which result from the use of cheaper fuels, the elimination of tall stacks, the ability to recover energy from the gases, the elimination of large uses of scrub water, and the reduction in size of required scrubbing equipment make the system economically attractive for installations of a wide range of sizes. Moreover, where the exhaust gases being treated contain a relatively high concentration of sulfurous compounds, elemental sulfur and/or sulfuric acid may be obtained from the compounds, thereby adding to the economy of operation of the system.

In the preferred practice of the present invention, exhaust gases are generated in the firebox of a combustion system, and the firebox is operated under sufficient pressure to obviate the need for blowers and compressors in the exhaust gas treatment system. By pressurizing the combined combustion and gas treatment system with a compressor upstream of the combustion system, the need for compression equipment downstream from the combustion system is eliminated. However, as a practical matter, where large gas volumes are generated, the combustion system cannot maintain much of a positive pressure and at least one downstream compressor is generally necessary.

BRIEF DESCRIPTION OF THE DRAWINGS

A fuller understanding of the invention may be had by referring to the following description and claims taken in conjunction with the accompanying drawings in which:

DESCRIPTION OF THE PREFERRED EMBODIMENTS

Figure 1:
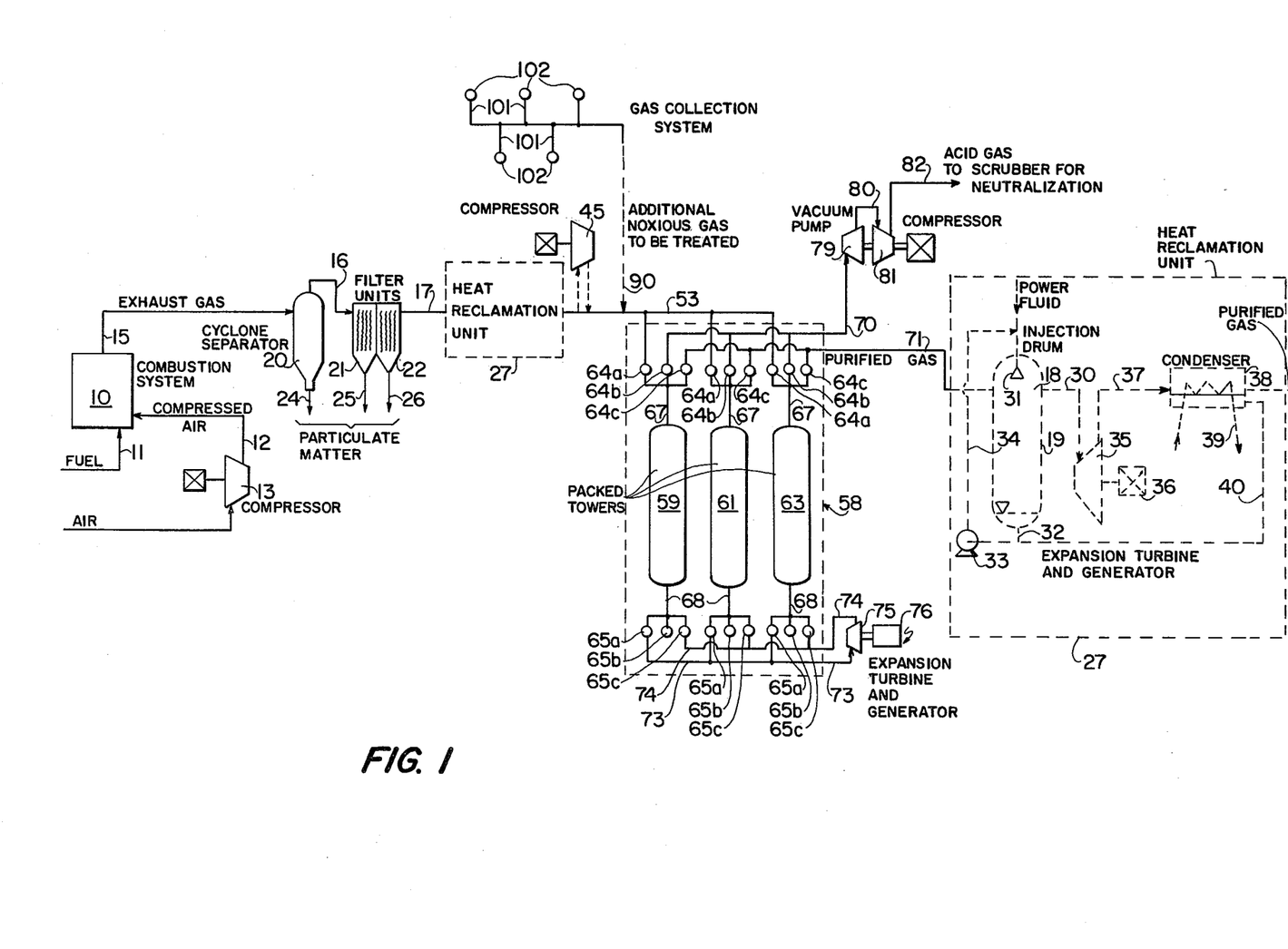
FIG. 1 is a schematic flow diagram of a system for practicing one embodiment of the present invention.

Referring to FIG. 1, a combustion or other gas producing system is indicated generally by the numeral 10. The system 10 can include one or more fuel burning furnaces, roasters, cement kilns and the like which emit hot exhaust gases as a product of fuel combustion and/or other chemical process which discharge hot exhaust gases containing such components as nitrogen, carbon dioxide, sulfur dioxide, hydrogen chloride, hydrogen sulfide, carbon monoxide, nitrogen oxide, hydrogen cyanide, and hydrocarbon components.

Fuel is supplied to the combustion system 10 as indicated by an arrow 11. In preferred operation, the fuel used in the system 10 is inexpensive solid or liquid fuel having a relatively high sulfur content. This fuel is preferred due to its low cost and because the sulfur content is easily separated out of exhaust gases as will be explained.

Air or oxygen enriched air is supplied to the combustion system 10 as indicated by an arrow 12. In preferred practice, a compressor 13 is used to pressurize the air supply 12 such that the combustion system operates under pressure. Depending on the magnitude of the pressure maintained in the system 10, one or more downstream gas compression units may be eliminated from the exhaust gas treatment system of the present invention, as will be explained. In a preferred form of the invention, the combustion system 10 is operated under sufficient pressure to obviate the need for blowers and compressors in the exhaust gas treatment system. By pressurizing the system with a compressor upstream of the combustion system 10, the need for compression equipment, such as optional compressor 45, downstream from the combustion system is eliminated. An exemplary preferred pressure in combustion system 10 which would eliminate the need for downstream compressors is about 40 psig.

Exhaust gases generated by the combustion system 10 are ducted, as indicated by arrows 15, 16, 17 to and through a series of particle separation units 20, 21, 22. The separation unit 20 is preferably a cyclone separator, and particulate matter as small as 50 microns in size is separated out of the gases, as indicated by an arrow 24. The separation units 21, 22 house filters which remove smaller particles as indicated by arrows 25, 26. The units 20, 21, 22 are insulated to avoid heat loss.

Exhaust gases which have been cleaned of particulate matter are ducted into a conduit indicated by the numeral 17. The conduit 17 ducts the exhaust gases either into optional heat reclamation unit 27 (if it is desired to cool the gases and recover the heat energy therein prior to purification) or into gas feeder conduit 53 for discharge into gas treatment and separation unit 58. If the heat energy of the exhaust gases is not reclaimed at this point, and heat reclamation is desirable, then the reclamation step can be practiced following purification in unit 58. FIG. 1 shows in phantom the alternative locations of the heat reclamation unit 27. The details of the unit 27 are illustrated (in phantom) for a unit located at the discharge of unit 58, although it should be appreciated that the very same unit can be located between filter units 21, 22 and gas treatment and separation unit 58. The following description of the system of FIG. 1 hypothetically locates unit 27 immediately downstream of the filter units.

Conduit 17 directs the exhaust gases to an injection drum 18. The drum 18 comprises a housing 19 through which exhaust gases pass before being discharged into conduit 30. As the gases pass through the housing 19, they are mixed with a power fluid which is sprayed or injected through spray nozzle 31 into enclosure 19. The resulting exhaust gas-power fluid mixture is gaseous and passes out of enclosure 19 into conduit 30. The power fluid is heavier and has a higher molecular weight than the exhaust gas and its mixture therewith causes the resulting mixture to have an increased volume. The power fluid is injected into the exhaust gas at about ambient temperature and at about the same pressure as the exhaust gas, causing the gaseous mixture to be cooler than but at substantially the same pressure as the exhaust gas. It is desirable to avoid condensation in the injection drum 18. However, should there be any condensation, the condensate is withdrawn through drain line 32 and recycled via pump 33 and recycle conduit 34 to the power fluid spray nozzle 31.

The conduit 30 ducts the exhaust gas-power fluid mixture to an expansion turbine 35 in which the gaseous mixture expands and cools. The work done by the gaseous mixture on the turbine is manifested as turbine shaft energy. Coupled to the output shaft of the turbine is a power generator 36. The cooled exhaust gas-power fluid mixture exhausting the turbine 35 is carried via duct 37 into condenser 38 where a flow of a heat exchange cooling medium, such as water, through coils 39 causes the power fluid to condense and further cools the exhaust gas. The condensed power fluid is returned to the injection drum 19 through return conduit 40, which communicates with the suction side of pump 33, and return conduit 34. The cooled exhaust gas is discharged from the condenser 38 into a gas feeder conduit indicated by the numeral 53.

As exhaust gases enter the injection drum 18 they typically have a temperature of from 150° to 180° C. After admixture with the sprayed power fluid, the gases exiting the injection drum 18 typically have a temperature of from 80° to 100° C. After the gases have been expanded through expansion turbine 35 and cooled in condenser 38 they are typically at a nearly ambient temperature of about 20° to 40° C. Of course, the temperature of the gases exiting injection drum 18 depends, to a large extent, on the amount of power fluid admixed therewith as well as on the temperature of the power fluid. If only very little power fluid is sprayed into the exhaust gas, not only will there be only a small change in gas temperature, but there will be little effect on gas volume as well. On the other hand, addition of a larger quantity of power fluid will have a greater effect in reducing the temperature of the exhaust gas and in increasing the volume thereof. The amount of power fluid to be added to the exhaust gas will vary depending upon, among other factors, the expansion turbine to be used, the pressure in the combustion system and the nature of the primary fluid.

It is important that the pressure of the gaseous mixture exiting turbine 35 be of sufficient magnitude to drive the gases through subsequent processing equipment. Accordingly, it is generally desired that the turbine exit gases have a pressure not less than about 10 psig. Inasmuch as a turbine expansion ratio of at least 2.5:1 to 3:1 is desired, and keeping in mind that there will be pressure drops across the separator 20 and filter units 21, 22, a minimum combustion system pressure of about 40 psig seems desirable. This value is, of course, not invariable and will depend on the system design, the pressure drops across the various items of filter equipment, and the pressure needed to drive the gases through subsequent processing. However, a good rule of thumb is that a compressor, such as optional compressor 45, should be used where the turbine exit gases prior to entering the regenerators have a pressure less than about 10 psig.

The gas feeder conduit 53 receives the cooled gases exiting condenser 38 (or exiting filter unit 22 if heat reclamation unit 27 is either not used or is located at the discharge of unit 58) ducts gases to a gas treatment and separation unit indicated generally by the numeral 58. The unit 58 is preferably of the same type described in U.S. Pat. No. 3,970,524 and is operable to separate the gases into condensable and noncondensable components by subliming or "freezing out" noxious, condensable components of relatively low volatility and components having similar vapor pressures, such as $C_3$ and $C_4$ fractions.

The unit 58 includes three similar packed towers or columns 59, 61, 63. Each of the towers 59, 61, 63 is similar to a regenerator described by Russell B. Scott at pages 29–31 of *Cryogenic Engineering*, published in 1959 by D. Van Nostrand Co., Princeton, N.J. Each of the towers 59, 61, 63 contains loose solids, for example, ceramic balls, quartzite pebbles, steel shot and other solids having large surface areas and capable of acting as heat capacitants and being resistant to corrosion.

Automatic switch valves 64a, 64b, 64c, and 65a, 65b, 65c are provided at opposite ends of the towers 59, 61, 63. Tower connection conduits 67, 68 communicate the towers 59, 61, 63 with the valves 64a, 64b, 64c and 65a, 65b, 65c.

The gas feeder conduit 53 connects with the valves 64a. An acid gas conduit 70 connects with the valves 64b. A vacuum pump 79 communicates with the acid gas conduit 70. A transfer conduit 80 communicates the pump 79 with a compressor 81. An acid gas discharge conduit 82 communicates with the compressor 81. A purified gas discharge conduit 71 connects with the valves 64c.

A pair of transfer conduits 73, 74 connect with the valves 65a, 65c. A cooling means, which could be a heat exchanger, but, if gas pressure is high enough is preferably an expansion turbine 75, communicates the transfer conduits 73, 74. An expansion turbine has the advantage that it produces useful shaft work at the same time that it cools the gas. To convert the shaft work to a more useful form of energy, a power generator 76 is coupled to the drive shaft of the turbine 75.

The manner by which gases are treated in the unit 58 may be visualized as that of subjecting the gases to several like cycles repeated time after time as long as exhaust gases are being produced by system 10. During each cycle, a different step is conducted simultaneously in each of the towers 59, 61, 63. While one of the towers is being cooled by a flow of cooled purified gas, separation is taking place in another tower, and condensed or sublimed components are being removed from the third tower.

A first step of one cycle is carried out by opening the valves 64a, 65a at each end of tower 59 and valves 64c, 65c at each end of tower 63. Gases will then flow through tower 59, will drive the turbine 75, and will flow through the tower 63. The gases expand in the turbine 75 and, as the gases expand, they are cooled. It is the flow of these cooled gases through the tower 63 that readies the tower 63 for a subsequent gas separation step. (It is assumed here that the tower 59 has already been pre-cooled in this manner in a previous cycle so that less volatile gas components loaded into the tower 59 will be sublimed or "frozen out".) The gases are allowed to flow in this manner for a short period of time, for example, for about 6 to 8 minutes. Energy extracted from these gases by the turbine 75 is used to drive the generator 76.

Gas cools in tower 59 due to contact with the large surface area of the cooler solids in the tower. Less volatile components of the gas are condensed or converted into the solid phase and remain in tower 59. The more volatile, noncondensed or clean components of the gas pass out of tower 59 and, via turbine 75, through tower 63. This clean gas is purified by being freed from the "frozen out," sublimed or condensed components. The turbine 75 expands the gas, thus further cooling it, and delivers the gas at a pressure of typically about 5 psig into tower 63. The pressure at which the gases enter the tower 63 is not critical. What is required is that the pressure ratio reduction effected in the turbine 75 is of sufficient magnitude to adequately cool the gases so the gases can properly chill the tower 63.

A second step (which is carried out simultaneously with the loading of exhaust gas into the tower 59 and the cooling of the tower 63) is that of cleaning a loaded tower by revaporizing the "frozen out," sublimed or condensed components remaining in that tower from a prior cycle. This step is carried out, for example in connection with tower 61, by closing the valves 65a, 65b, and 65c at the lower end of tower 61 and by connecting the other end of that tower through valve 46b to the vacuum pump 79 and compressor 81. The valves 65b are used only if a fourth regenerator is linked to the system. The pump 79 operates to reduce the pressure in the tower 61 by a ratio of about 10 to 1. As pressure in the tower is reduced, the "frozen out," sublimed or condensed components are revaporized to form an acid gas which is drawn out of the tower 61. The withdrawn acid gas is compressed by the compressor 81 and is discharged into the acid gas discharge conduit 82. The acid gas typically consists mainly of $CO_2$ with small amounts of $H_2S$, $SO_2$, $SO_3$, HCN and other noxious gases. Noxious gases, containing chlorine, sulfur, and the like, may be neutralized, as by scrubbing with caustic solution. Combustible components of the neutralized gases are preferably separated out and retained for use. Such gases can be burned in the combustion system 10.

The next cycle is like the one just described and consists of a first step of passing gases from the conduit 53 through one of the valves 64a into the cooled tower 63, separating, by "freezing out" or subliming, components of the gases in that tower, cooling the separated clean gas leaving tower 63 in the turbine 75 and passing the cooled, expanded clean gas through the recently cleaned tower 61 to chill that tower in preparation for receiving the next charge of exhaust gases from conduit 53. A second step is that of simultaneously revaporizing the "frozen out," sublimed or condensed components which remain in the tower 59 from the prior cycle to clean that tower in preparation for chilling during the next cycle.

The next cycle is like the two foregoing cycles. Its first step is that of passing gases from the conduit 53 into the tower 61 to separate out gaseous components and cooling the just cleaned tower 59 with the separated clean gas fraction from tower 61 and turbine cooling means 75. A second step is to clean tower 63 by revaporizing components remaining in the tower 63 from the previous cycle by withdrawing them through vacuum pump 79 and compressor 81.

The purified gases (which are cool if their heat energy has been reclaimed) discharged into the conduit 71 can, if desired, be exhausted to atmosphere without the use of a flue gas stack. Alternatively they can be put to use. For example, inasmuch as these gases are dry, they can be used to advantage in evaporative cooling towers and the like. If the heat energy of the gases has not previously been recovered, they may be passed into a heat reclamation unit 27 (shown in phantom) in which the gases will be cooled while their heat energy is transferred to a power fluid.

The acid gas discharged into the conduit 82 may be transferred to a scrubbing unit where it is scrubbed with caustic solution. Alternatively, the acid gas may be put to any suitable use.

Noxious gases created in chemical processes other than combustion can be mixed with gases in the feeder conduit 53 and treated in the unit 58. The optional addition of such gases is indicated by broken line 90 in FIG. 1. A sewer-like blow down system of gas collection conduits 101 can be used to collect exhaust gases from a plurality of gas producing apparatuses 102. Suitable compression equipment (not shown) can be included in the conduit system 101 to transfer the collected gases into the conduit 53.

Many power fluids can be used in the system of the present invention, including water, carbon dioxide ammonia, propane, butane, pentane, hexane, various halogenated methane compounds, such as the flurocarbons, and lithium bromide. Most desirable are power fluids which are immiscible with and insoluble in water to prevent power fluid separation problems in condenser 38. Prehalogenated benzenes, for example, as are disclosed in U.S. Pat. No. 3,702,534 issued Nov. 14, 1972 to Max F. Bechtold, the disclosure of which is incorporated herein by reference, are preferred because they are immiscible with water and can be used over a wide range of temperatures without risk of decomposition and toxicity. Moreover prehalogenated benzenes have the advantage of high molecular weight, low flamability and low corrosivity.

Figure 2:
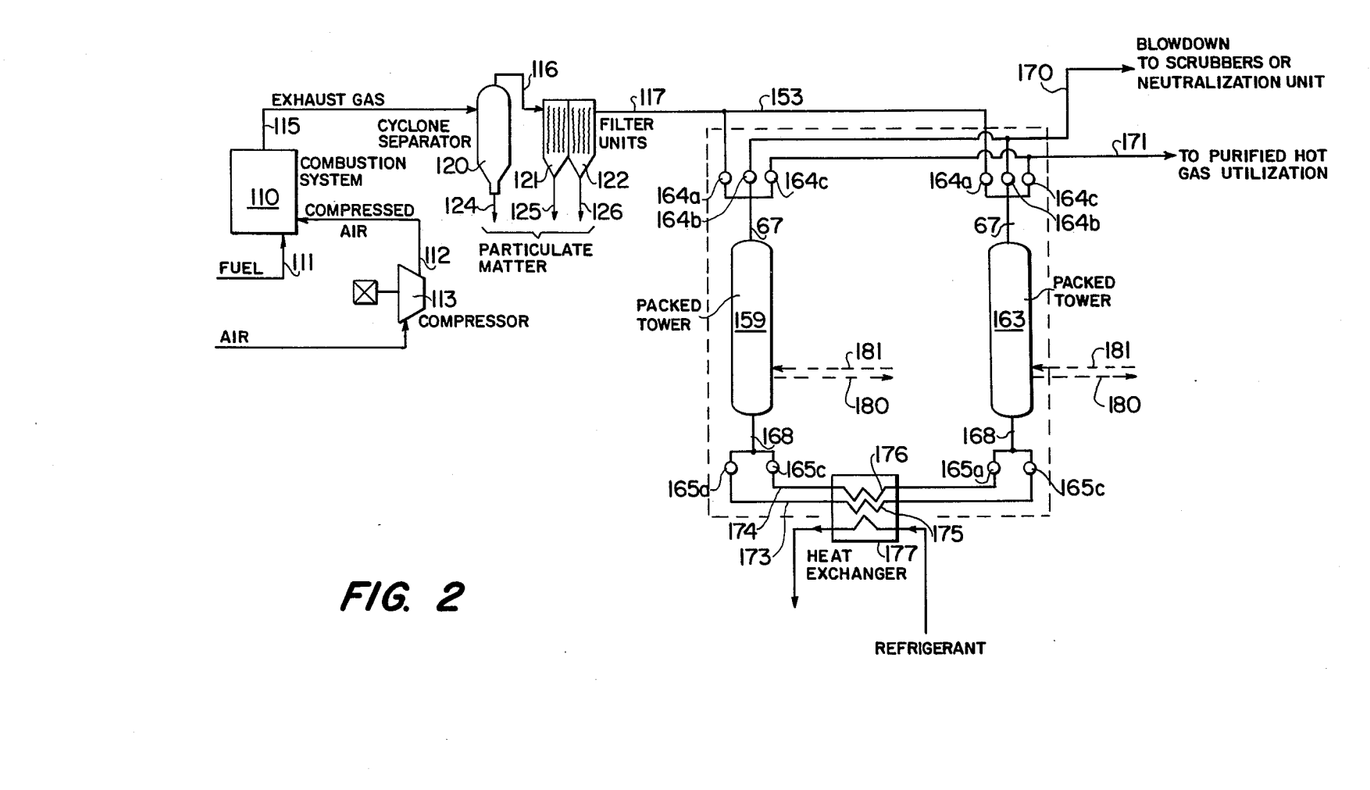
FIG. 2 is a schematic flow diagram of a system for practicing another embodiment of the present invention.

Referring to FIG. 2, another embodiment of the present invention is illustrated in which the exhaust gases are subjected to treatment to separate them into condensable and noncondensable components by subliming or "freezing out". The combustion system and particulate matter separation units shown in FIG. 2 may be just like their counterpart units in FIG. 1. Thus, combustion system 110 is fueled from a fuel supply source 111 and air or oxygen is supplied to the combustion system 110 through air or oxygen supply line 112. Preferably air supply line 112 includes a compressor 113 to pressurize the air supply and to maintain the combustion system 110 operating under a positive pressure. In this embodiment of the invention, where hot gases are treated throughout, downstream compressors are inefficient and, hence, undesirable. Therefore the gases in the gas treatment system are maintained under sufficient pressure by a compressor in the combustion system 110, such as compressor 113, or by a compressor located upstream of the combustion system 110.

Exhaust gases generated by the combustion system 110 are ducted, as indicated by arrows 115, 116, 117 to and through a series of particle separation units 120, 121, 122. The separation unit 120 is preferably a cyclone separator, and particulate matter as small as 50 microns in size is separated out of the gases as indicated by an arrow 124. The separation units 121, 122 house filters which remove smaller particles as indicated by arrows 125, 126. The units 120, 121, 122 are insulated to avoid heat loss.

Exhaust gases which have been cleaned of particulate matter are ducted into a conduit indicated by the numeral 117. The exhaust gases in this conduit have a slightly reduced pressure due to pressure losses in the filters, but are at substantially the same temperature as when they exited the combustion system 110. These gases are led from conduit 117 into gas feeder conduit 153 which directs the hot gases to gas treatment and separation unit 158. The unit 158 is preferably similar to the type described in U.S. Pat. No. 3,970,524 and is operable to separate the hot gases into condentively low volatility and components having similar vapor pressures, such as $C_3$ and $C_4$ fractions.

The unit 158 includes two similar packed towers or columns 159, 163. Each of the towers 159, 163 is similar in construction, content and function to the regenerators shown as 59, 61, 63 in FIG. 1. Automatic switch valves 164a, 164b, 164c and 165a, 165c are provided at opposite ends of the towers 159, 163. Tower connection conduits 167, 168 communicate the towers 159, 163 with the valves 164a, 164b, 164c and 165a, 165c. The gas feeder conduit 153 connects with the valves 164a. An acid gas discharge blowdown conduit 170 connects with the valves 164b. A purified hot gas discharge conduit 171 connects with the valves 164c. A pair of transfer conduits 173, 174 connect with valves 165a, 165c of towers 159, 163 and with coils 175, 176, respectively, of heat exchanger 177.

As with unit 58 of FIG. 1, the manner by which gases are treated in the unit 158 may be visualized as that of subjecting the gases to several like cycles repeated time after time as long as exhaust gases are being produced by combustion system 110. During each cycle, a different step is conducted in each of towers 159, 163. While a first tower is being cooled by a flow of relatively cool purified gas, separation is taking place in the second tower. Condensed or sublimed components are removed from the second tower at the beginning of the next cycle by the initial flow of purified gas therethrough from the first tower, as will be explained more fully hereinafter.

A first step of one cycle is carried out by opening the valves 164a, 165a at each end of tower 159 and valves 164c, 165c at each end of tower 163. Gases will then flow from gas feeder conduit 153 through tower 159, in which the gases cool and components of the gas are sublimed or "frozen out". The gas, freed of the less volatile components, is further cooled in coils 175 of heat exchanger 177 and flows through tower 163, cooling the solid packing in tower 163 as it passes therethrough and becoming reheated itself as it does so. It is the flow of cooled gases through tower 163 that readies the tower 163 for the next cycle during which gas separation by sublimation or "freezing out" will take place therein. (It is assumed here that the tower 159 has already been pre-cooled in this manner in a previous cycle so that less volatile gas components loaded into tower 159 will be sublimed or "frozen out"). The gases are allowed to flow in this manner for a short period of time, for example, for about 6 to 10 minutes. Energy extracted from the gases in the heat exchanger 177 may be used in any suitable manner. Moreover, inasmuch as the purpose of heat exchanger 177 is to function as a means for cooling the purified exhaust gases to permit them, in turn, to cool the tower into which they next flow, any suitable heat exchange means may be substituted for heat exchanger 177. Exemplary of a useful means is an expansion turbine to which a power generator may be coupled if desired. When an expansion turbine is used, the gases expand in the turbine and are cooled as they expand. The expansion pressure ratio in the turbine need only be sufficient to accomplish the desired cooling. In view of this additional pressure drop, a system which utilizes an expansion turbine will generally operate at a somewhat higher combustion system pressure as compared to a system which utilizes a conventional heat exchanger. Where an expansion turbine is not used, it is generally desirable to expand the cooled gas exiting heat exchange means 177. For this purpose, valves 165c at the heat exchanger end of towers 159, 163 may be throttling valves.

The hot, purified gases leaving tower 163 are directed through line 167 and valve 164c into hot gas discharge conduit 171. These hot gases may be used for any suitable purpose or may be further treated, in a manner to be hereinafter described, to reclaim the heat energy therein. It will be appreciated that in the immediately previous cycle, tower 163 had been used for the sublimation or "freezing out" step and the less volatile components of the gas had been condensed or converted into the solid phase and had remained within tower 163, i.e., the tower was loaded. To clean loaded tower 163 by revaporizing the "frozen out", sublimed or condensed components from the prior cycle to form an acid gas, the initial flow of purified gas from tower 159 which passes through tower 163 is diverted from hot gas discharge conduit 171, by closing valve 164c and opening valve 164b. The mixed flow of purified gas and revaporized components, i.e., acid gas, are ducted through valve 164b into blowdown conduit 170. The acid gas typically consists mainly of $CO_2$ with small amounts of $H_2S$, $SO_2$, $SO_3$, HCN and other noxious gases. Inasmuch as flue gas discharge restrictions preclude emission of these gases, most noxious components in the blowdown gases are neutralized by scrubbing or otherwise separated out to permit exhausting the cleansed blowdown gas. Cleaning of the loaded tower in this manner can be accomplished during each cycle by switching the initial purified gas flow to the blowdown line 170 for just enough time to purge the tower and then switching the gas flow back to the purified gas line 171.

If during the first cycle the exhaust gases were loaded into tower 159 and simultaneously the acid gases were purged from tower 163 while tower 163 was cooled, during the next cycle the exhaust gases are loaded into cooled tower 163. This next cycle is like the one just described and consists of passing gases from conduit 153 through one of the valves 164a into the cooled tower 163; separating, by "freezing out" or subliming, components of the gases in that tower; cooling (or expanding and cooling if a turbine is used) the separated clean gas leaving tower 163 in heat exchanger 177; and passing the relatively cooled, clean gas through tower 159 (which is loaded from the previous cycle) to purge and to cool the tower. The initial flow through tower 159 revaporizes the loaded components and the mixed clean gas—revaporized components flow out through valve 164b into blowdown line 170. After a short time this purging flow is terminated and the clean gas flow through tower 159 is diverted through valve 164c into purified gas discharge line 171.

Figure 4:
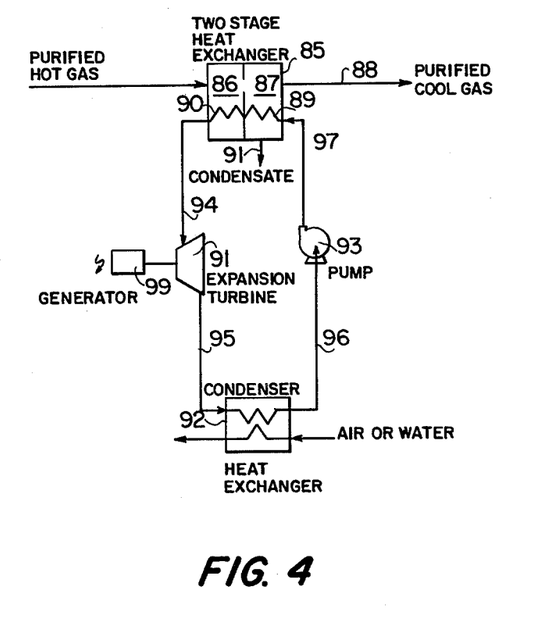
FIG. 4 is a schematic flow diagram of a typical Rankine cycle engine which may be used to recover the heat energy from purified hot gases.

One means for reclaiming the heat energy contained in the hot, purified gases is shown in FIG. 4 and comprises passing the gases through a heat exchanger 85 wherein they give up their heat energy to a power fluid which, in turn, operates as the fluid in a Rankine cycle engine to do useful work. Heat exchanger 85 preferably has first and second stages 86, 87 arranged in series. As the gases pass through the stages 86, 87 they sacrifice sensible and latent heat to the power fluid which circulates in coils 89, 90. If the heat of purified gases is utilized, stages 86 and 87 may be combined into a single unit. Inasmuch as the gases are cooled below their dew point in the heat exchanger 85, the latent heat of steam is recovered and part of the high heating value of the gases is recovered, unlike prior systems which recovered only the low heating value of hot exhaust gases. In the first stage 86, the exhaust gases are cooled to a temperature near but slightly above their dew point. In the second stage 87, the temperature of the exhaust gases is further reduced and moisture in the gases condenses. Condensate is withdrawn from the second stage 87, as indicated by an arrow 91, and is treated to reclaim the condensed water, which may be used as a scrubbing fluid elsewhere in the process, such as in neutralizing the less volatile components.

The power fluid which is heated by exhaust gases passing through the two stage heat exchanger 85 is used to perform useful work. In the preferred embodiment, the heat exchanger coils 89, 90 form the boiler of an external combustion engine. Such an engine typically includes an expansion turbine 91, a condenser 92, and a pump 93, connected in series by conduits 94, 95, 96, 97.

Power fluid heated during passage through the coils 89, 90 is expanded in the turbine 91 and serves to drive a generator 99. The power fluid is then ducted through the condenser 92 and the pump 93 for return to the heat exchanger coils 89, 90.

Another means for reclaiming the heat energy of the exhaust gases is to remove it directly from the heated tower solids using a heat transfer fluid other than the purified gases. According to this method, the purified gases entering the heated tower 159, 163 for reheating are removed from the tower via tap line 180 after passing through only a portion of the heated solids in the tower. Typically, the purified gases are tapped from the tower at a point where they just about reach ambient temperature and then discharged to the atmosphere or utilized. The balance of the heat in the tower solids is recovered by passing a fluid heat transfer medium, e.g., compressed air, into the tower through line 181 and processing the heated medium exiting the tower via line 171 in the same manner as reheated purified gas exiting via line 171 is processed.

Figure 3:
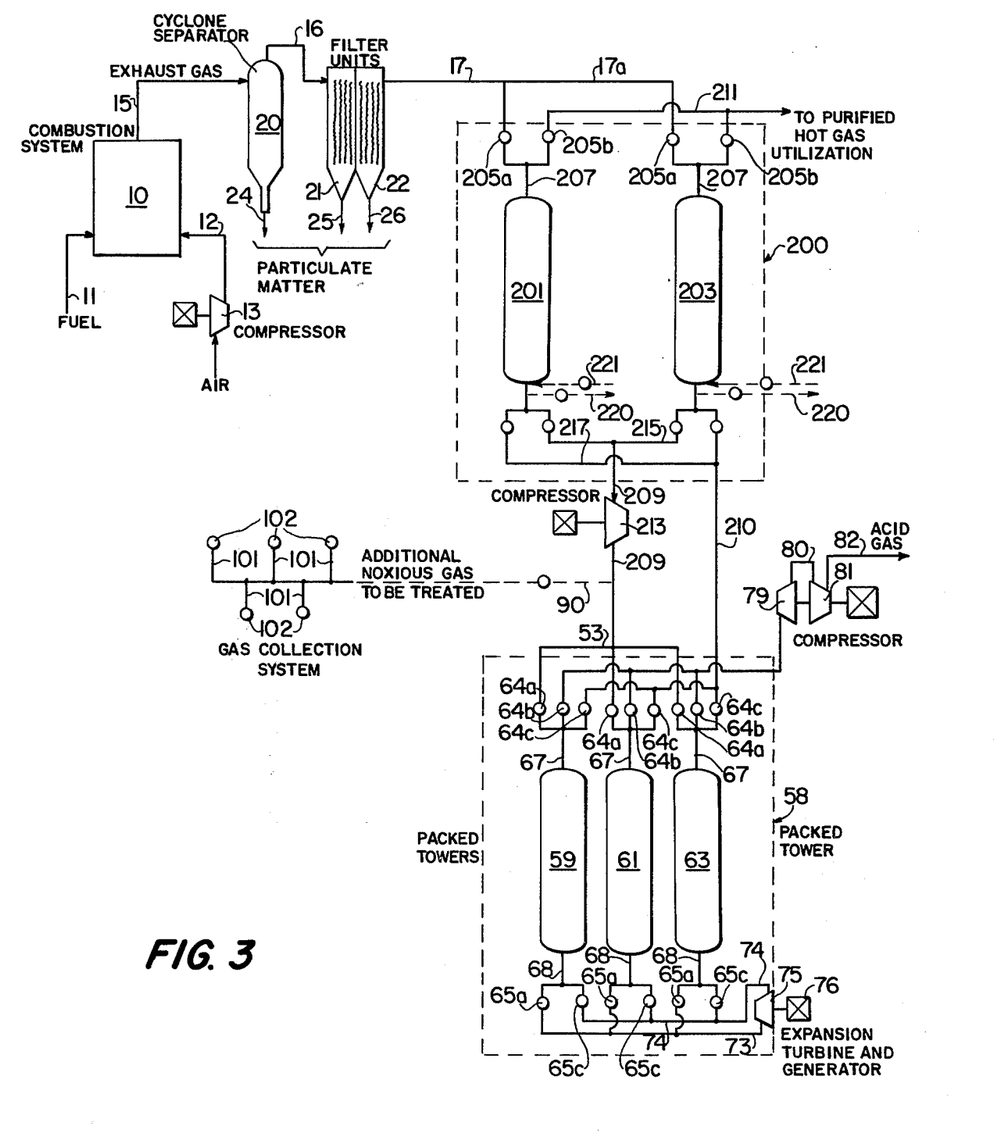
FIG. 3 is a schematic flow diagram of a system for practicing still another embodiment of the present invention.

Referring to FIG. 3 there is shown still another embodiment of the present invention which differs from the embodiment of FIG. 1 primarily in the manner in which the exhaust gases are cooled prior to being processed in the gas treatment and separation unit. The method and system of this embodiment is particularly useful in large power plant installations where the stack or exhaust gas has a volume of up to 2,500,000 Nm³/hr. In view of the similarity between the systems in FIG. 1 and FIG. 3 like numerals are used to designate like components.

As in the system of FIG. 1, the combustion system 10 is fueled from a fuel supply source 11 and air or oxygen is supplied to the combustion system 10 through air or oxygen supply line 12. Preferably, air supply line 12 includes a compressor 13 to pressurize the air supply and to maintain the combustion system 10 operating under positive pressure. By pressurizing the system with a compressor in or upstream of the combustion system 10, the need for compression equipment downstream from the combustion system is diminished or eliminated. As a practical matter, however, where the configuration of FIG. 3 is used in connection with very large exhaust gas volumes, the combustion system can generally not maintain much of a positive pressure. Therefore, a downstream compressor, preferably installed upstream of the gas treatment and separation unit 58, is generally necessary.

Exhaust gases generated by the combustion system 10 are directed as indicated by arrows 15, 16, 17 to and through a series of particle separation units 20, 21, 22. The separation unit 20 is preferably a cyclone separator, and particulate matter as small as 50 microns in size is separated out of the gases, as indicated by an arrow 24. The separation units 21, 22 house filters which remove smaller particles as indicated by arrows 25, 26. The units 20, 21, 22 are insulated to avoid heat loss.

Exhaust gases which have been cleaned of particulate matter are ducted into conduit 17 from which they pass through feed conduit 17a into exhaust gas cooling and heating unit 200. Unit 200 is operable (1) to cool the exhaust gases prior to ducting them to gas treatment and separation unit 58 for separation into condensable and noncondensable components by subliming or "freezing out", and (2) to receive the purified gases exiting gas treatment and separation unit 58 and to reheat the purified gases to within a few degrees of the temperature of the exhaust gases which entered unit 200 through feed conduit 17a. Unit 200 includes two similar packed towers or columns 201, 203. Each of the towers 201, 203 is similar in construction and content to the regenerators shown as 59, 61, 63 in FIG. 1. Automatic switch valves 205a, 205b are provided at the end of towers 201, 203 adjacent feed conduit 17a. Tower connection conduits 207 communicate the towers 201, 203 with the valves 205a, 205b. Tower connection conduits 209, 210 communicate the towers 201, 203, respectively, with feed conduit 53 of the gas treatment and separation unit 58. Feed conduit 17a connects with the valves 205a. A purified hot gas discharge conduit 211 connects with the valves 205b. A compressor 213 is included in tower connection conduit 209 to provide the positive pressure in the system which is almost invariably required when very large exhaust gas volumes are passed through the FIG. 3 system. Conduits 209 and 210 are cross connected through conduits 215 and 217 (which contain appropriate flow control valves) upstream of the compressor 213 to allow either tower 201, 203 to function as the heating or cooling tower.

Gas treatment and separation unit 58 is substantially the same unit and operates in substantially the same manner as is shown and described in connection with FIG. 1. In the FIG. 3 embodiment, however, unlike the FIG. 1 embodiment, the purified gas is directed back through the gas cooling and heating unit 200 for reheating prior to utilization or discharge to the atmosphere, all as will be more fully described hereinafter.

The manner by which large volumes of gas are treated in the system of FIG. 3 may be understood from the following. Fuel and air are burned in the combustion system 10, which is preferably operated under a positive pressure, such as may be provided via air line compressor 13 or from some other upstream compressor unit. The hot exhaust gases resulting from the combustion are cleaned of their particulate content in cyclone separator 20 and filter units 21, 22 and are ducted via conduit 17 into gas heating and cooling feed conduit 17a. Inasmuch as the combustion system boilers cannot be expected to maintain a sufficiently high positive pressure, a downstream compression stage is required and cooling of the gas is desirable prior to the compression stage. This cooling of the gases is very effectively performed in regenerators, such as packed towers 201, 203, since the pressure drop across the regenerators is relatively small (about 1.4 psi).

The manner by which gases are treated in unit 200 may be visualized as that of subjecting the gases in successive like cycles to heating and cooling in towers 201, 203. During each cycle, a different step is being conducted in each of towers 201, 203. While a first tower is serving as the cooling tower to cool the hot gases, the other tower is serving to heat the purified gases leaving unit 58. In the next cycle, the roles of the respective towers are reversed. Thus in a first cycle one of the towers 201, 203 is selected as the cooling tower into which the hot particle free exhaust gases are ducted and the corresponding valve 205a is opened.

If tower 201 is to serve as the cooling tower, valve 205a associated therewith and valve 205b associated with tower 203 are opened while valve 205b associated with tower 201 and valve 205a associated with tower 203 remain closed. The hot exhaust gases flow from feed conduit 17a through valve 205a into tower 201 in which the gases are cooled prior to compression in compressor 213. At the same time the tower 201 is heated by the hot gases in preparation for serving as the heating tower in the next cycle. The compressed gases are then directed via cross conduit 215 through conduit 209 to feed conduit 53 for processing in gas treatment and separation unit 58. If desired, other noxious gases may be mixed with the compressed exhaust gases entering feed conduit 53 (optional addition indicated by broken line 90). Following processing in unit 58, the purified gases leaving towers 59, 61, 63 through valves 64c are ducted via tower connection conduit 210 into and through tower 203 in which the purified gases are reheated while the tower is cooled (it is assumed that tower 203 has been pre-heated in a previous cycle by passage of hot exhaust gases therethrough). The hot purified gases leave tower 203 by way of tower connection conduit 207 through valve 205b and conduit 211 and may be discharged to the atmosphere or, more likely, utilized, such as by reclaiming the heat energy contained therein. One means for reclaiming the heat energy is shown in FIG. 4. Operation of the FIG. 4 means to transfer the heat energy of the gases to a power fluid which, in turn, operates as the fluid in a Rankine cycle engine has already been described herein in connection with the embodiment of FIG. 2. In a typical system the hot gases entering the cooling tower 201 are at a temperature of about 150°–180° C. and are cooled in the tower to about 20°–40° C., at which temperature the gases are compressed and enter unit 58. The purified gases leaving unit 58 are reheated in tower 203 to within 2° to 5° C. of the temperature of the gases entering tower 201. As was described in connection with the embodiment of FIG. 2, another means for reclaiming the heat energy of the gases is to remove it directly from the heated tower solids. For this purpose tap lines 220 and heat transfer medium injection lines 221 are provided in connection with towers 201 and 203.

The next cycle is like the one just described except that tower 203 serves as the cooling tower and tower 201 as the reheating tower. It will be appreciated that following the previous cycle, tower 201 was left in a relatively heated state by the passage of hot exhaust gases therethrough whereas tower 203 was left in a relatively cooled state by virtue of having given up its heat content to the purified gases passing therethrough. The hot exhaust gases flow from feed conduit 17a through valve 205a into tower 203 in which the gases are cooled while the tower is heated. They are then ducted via cross conduit 215 to compressor 213 in which they are compressed. The compressed gases are ducted through conduit 209 to feed conduit 53 for processing in gas treatment and separation unit 58. Following processing in unit 58, the purified gases leaving towers 59, 61, 63 through valves 64c are ducted via tower connection conduit 210 and cross conduit 217 into tower 201 in which the purified gases are reheated while the tower is cooled. The hot purified gases leave tower 201 by way of tower connection conduit 207 through valve 205b and conduit 211 and may then be discharged or utilized, such as by reclaiming the heat energy therein.

While the invention has been described with reference to particular embodiments thereof, it will be understood that numerous modifications may be made by those skilled in the art without actually departing from the scope of the invention. For example, the methods and systems illustrated in FIGS. 1, 2 and 3 are effective to reduce the impurity levels in the purified gas to trace levels. Should it be desired to completely remove all sulfurous compounds and other harmful components, adsorption or absorption systems can be linked, in known manner, to the systems of FIGS. 1, 2 and 3. Accordingly, all modifications and equivalents may be resorted to which fall within the scope of the invention as claimed.

I claim:

1. A method of treating hot exhaust gas, comprising the steps of:
    (a) removing particulate matter from the gas;
    (b) cooling the gas to effect a separation of harmful, less volatile components from more volatile components;
    (c) compressing the gas at some time prior to the completion of step (b);
    (d) discharging the more volatile components to atmosphere; and
    (e) processing the less volatile components.

2. A method, as claimed in claim 1, including the step of productively reclaiming a portion of the heat energy of the gas at some time prior to the completion of step (d).

3. A method, as claimed in claim 2, wherein the step of productively reclaiming is conducted between the steps of removing particulate matter and cooling the gas.

4. A method, as claimed in claim 2, wherein the step of productively reclaiming is conducted after the step of cooling the gas, whereby the cooling step is practiced on the hot exhaust gas.

5. A method, as claimed in claims 3 or 4, wherein the step of productively reclaiming includes passing the hot gas in direct heat exchange relationship with a fluid to concurrently cool the gas and heat the fluid.

6. A method, as claimed in claims 3 or 4, wherein the step of productively reclaiming includes mixing the hot gas with a power fluid to form a hot gas-power fluid gaseous mixture having a temperature less than the temperature of the hot gas prior to mixing and expanding the gaseous mixture through an expansion engine whereby the mixture is cooled to a temperature substantially below the temperature of the hot exhaust gas and said engine produces shaft work.

7. A method, as claimed in claim 6, including the step of further cooling the expanded gaseous mixture by passing it in indirect heat exchange relationship with a fluid whereby the power fluid condenses.

8. A method, as claimed in claim 6, wherein said mixing is accomplished by spraying said power fluid into said exhaust gas.

9. A method, as claimed in claims 2 or 3, wherein the step of compressing the gas is conducted, at least in part, between the steps of reclaiming heat energy and cooling the gas.

10. A method, as claimed in claim 4, including the step of cooling the hot exhaust gas prior to the step of cooling the gas to effect a separation of components and further including the step of reheating the gas to a temperature below the temperature of the exhaust gas following the step of cooling the gas to effect a separation of components and prior to the steps of discharging and neutralizing components.

11. A method, as claimed in claim 10, wherein the step of compressing the gas is conducted, at least in part, between the steps of removing particulate matter and cooling the gas to effect a separation of components.

12. A method, as claimed in claim 10, wherein the step of compressing the gas is conducted, at least in part, between the steps of cooling the hot exhaust gas and cooling the gas to effect a separation of components.

13. A method, as claimed in claim 12, wherein the steps of cooling the hot exhaust gas and reheating the gas are accomplished by passing said gas in intimate heat transfer contact with the surface area of solid materials.

14. A method, as claimed in claims 4, 10, 11, 12 or 13, wherein the step of reclaiming heat energy from the hot gas includes cooling the gas to a temperature below its dew point.

15. A method, as claimed in claim 14, wherein the step of reclaiming heat energy from the gas includes passing the gas in heat exchange relationship with a fluid to concurrently cool the gas and heat the fluid, said heated fluid being used as a power fluid which is expanded to produce useful work in an external combustion engine.

16. A method, as claimed in claims 1, 2, 3, 4, 10, 11 or 12, wherein the hot exhaust gas being treated is combustion exhaust gas from a fuel burning device having a firebox, and the step of compressing the gas is conducted, at least in part, by operating the firebox of the fuel burning device under pressure whereby hot exhaust gases are discharged under positive pressure from the device.

17. An apparatus for treating hot exhaust gas comprising:
(a) separator means for removing particulate matter from the hot gas;
(b) cooling means for separating the gas into less volatile and more volatile components;
(c) discharge means for discharging the more volatile components to atmosphere;
(d) recovery means for recovering and processing the less volatile components; and
(e) compressor means for compressing the gas at a point upstream of said recovery means.

18. An apparatus, as claimed in claim 17, including heat exchange means receiving said gas at a point upstream of said discharge means for productively reclaiming a portion of the heat energy of the gas.

19. An apparatus, as claimed in claim 18, wherein said heat exchange means is disposed between said separator means and said cooling means, whereby particle free gas is received in said heat exchange means and cooled gas is discharged therefrom into said cooling means.

20. An apparatus, as claimed in claim 18, wherein said heat exchange means is disposed downstream of said cooling means, whereby said cooling means receives hot exhaust gas directly from said separator means.

21. An apparatus, as claimed in claims 19 or 20, wherein said heat exchange means includes means for passing the hot gas into direct heat exchange relationship with a fluid to concurrently cool the gas and heat the fluid.

22. An apparatus, as claimed in claim 19 or 20, wherein said heat exchange means includes means for directly mixing said hot gas with a power fluid to form a hot gas-power fluid gaseous mixture having a temperature less than the temperature of the hot gas prior to mixing and expansion engine means for expanding the gaseous mixture, whereby said gaseous mixture is cooled and said engine produces shaft work.

23. An apparatus, as claimed in claim 22, wherein said means for directly mixing includes a chamber having an inlet and an outlet and spray means disposed therebetween for spraying power fluid into hot gas in said chamber passing from said inlet to said outlet.

24. An apparatus, as claimed in claim 23, wherein said heat exchange means further includes condenser means for separating the power fluid from the cooled gaseous mixture exiting said expansion engine.

25. An apparatus, as claimed in claim 24, including means for recycling said separated power fluid to said spray means.

26. An apparatus, as claimed in claims 18 or 19, wherein said compressor means includes a compressor operable to compress gas at a point downstream of said heat exchange means and upstream of said cooling means.

27. An apparatus, as claimed in claim 20, including pre-cooling means for cooling the hot exhaust gas prior to said gas entering said cooling means and further including re-heating means for reheating the gas exiting said cooling means.

28. An apparatus, as claimed in claim 27, wherein said compressor means includes a compressor operable to compress gas at a point downstream of said pre-cooling means and upstream of said cooling means.

29. An apparatus, as claimed in claim 28, wherein each of said pre-cooling means and said reheating means comprise a chamber containing a plurality of large surface area solids therein.

30. An apparatus, as claimed in claims 18, 27, 28 or 29, wherein said heat exchange means includes first and second stages, the first stage being operable to reduce gas temperature to a temperature near but still above its dew point, and the second stage being operable to reduce gas temperature to a temperature below its dew point.

31. An apparatus, as claimed in claim 30, wherein said heat exchange means forms part of an external combustion engine operable to produce useful work and said external combustion engine includes an expansion turbine through which the heated fluid is passed to convert heat energy reclaimed from the hot gas into rotary mechanical motion.

32. An apparatus, as claimed in claims 17, 18, 19 or 20 wherein the hot exhaust gases are combustion exhaust gases and said apparatus includes a firebox of a fuel burning device for generating said gases and compressor means operable to compress the gas by pressurizing a supply of air to said firebox.

* * * * *